C. W. PLACE.
ELECTRICAL SYSTEM OF DISTRIBUTION.
APPLICATION FILED MAR. 17, 1920.
1,362,637.
Patented Dec. 21, 1920.
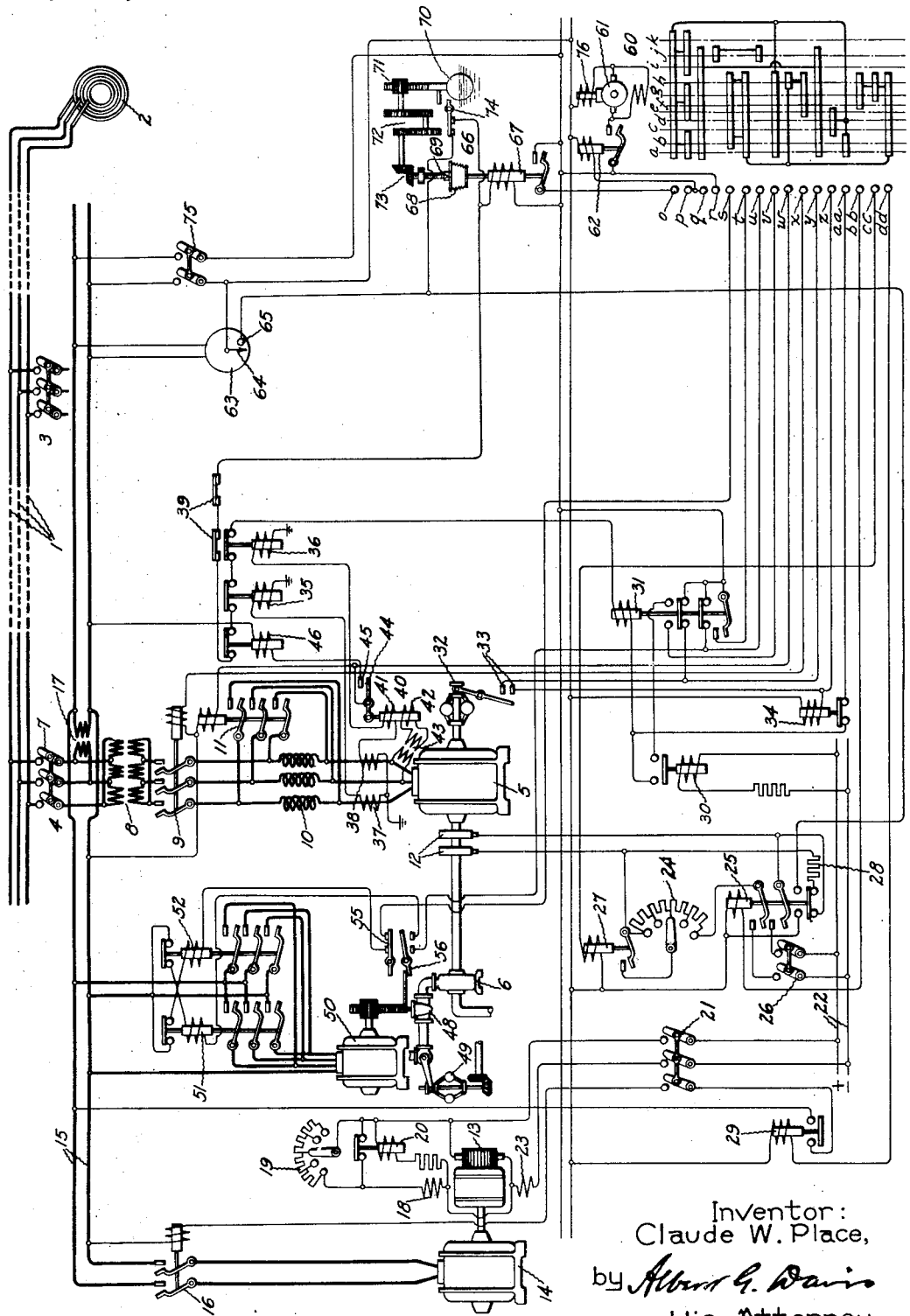
Inventor:
Claude W. Place,
by Albert G. Davis
His Attorney.

UNITED STATES PATENT OFFICE.

CLAUDE W. PLACE, OF LA GRANGE, ILLINOIS, ASSIGNOR TO GENERAL ELECTRIC COMPANY, A CORPORATION OF NEW YORK.

ELECTRICAL SYSTEM OF DISTRIBUTION.

1,362,637.  Specification of Letters Patent.  Patented Dec. 21, 1920.

Application filed March 17, 1920.  Serial No. 366,596.

*To all whom it may concern:*

Be it known that I, CLAUDE W. PLACE, a citizen of the United States, residing at La Grange, in the county of Cook, State of Illinois, have invented certain new and useful Improvements in Electrical Systems of Distribution, of which the following is a specification.

My invention relates to electrical systems of distribution and more particularly to automatic prime mover dynamo plants and their operation. My invention finds its greatest field of utility in the automatic operation of hydro-electric plants.

According to my invention a plurality of prime mover dynamo plants are adapted to be connected to a common network in the following manner; all the idle plants, which are in an operative condition, are adapted to be automatically started up whenever a predetermined condition occurs, such as, for example, a drop in the frequency of the network, and to be connected to the network in a sequence determined by a condition of the plants, such as the relative amount of energy available at the plants for driving the prime movers thereat.

When the idle plants are arranged to be started up in response to a predetermined abnormal condition of the network, such as a preterimined drop in the frequency of the network which indicates that the plants connected thereto are overloaded, it is desirable to connect only as many of the idle plants as are necessary to restore the network to its normal condition. It is, therefore, a further object of my invention to arrange each plant so that it will automatically shut down if the condition, which causes the plant to start up, is removed before it begins to furnish energy to the network.

A further object of my invention is to arrange each plant so that it will automatically shut down when the output of the plant falls below a predetermined value and also when certain abnormal conditions occur, such as a short circuit or when the amount of energy available for driving the prime mover decreases below a predetermined value.

My invention will be better understood from the following description taken in connection with the accompanying drawing and its scope will be pointed out in the appended claims.

The single figure of the drawing is a diagram illustrating the apparatus employed and the connections used in one embodiment of my invention.

Referring to the drawing, 1 represents a three phase alternating current distribution circuit which is adapted to be supplied with electrical energy from a plurality of prime mover dynamo plants, three of which I have indicated by the numerals 2, 3 and 4. It will be assumed that the plant 2 is a manually controlled plant which supplies energy at a predetermined frequency to the distribution circuit at all times and that the plants 3 and 4 are automatic plants which are adapted to supply energy to the distribution circuit under certain predetermined conditions. In order to simplify the disclosure I have shown in detail only the apparatus employed and the connections used in the automatic plant 4. It will be assumed that the apparatus and connections of the automatic plant 3 are the same as shown in connection with plant 4.

The plant 4 comprises an alternating current generator 5 of any suitable type driven by a water-wheel 6 and adapted to be connected to the distribution circuit 1 to supply energy thereto. The plant may be provided with any suitable apparatus whereby the generator may be automatically connected to the distribution circuit, pulled into step therewith, and caused to supply energy thereto whenever a predetermined condition occurs and may be disconnected from the distribution circuit under certain other predetermined conditions. The particular apparatus I have shown comprises a disconnecting switch 7, transformers 8 and a contactor 9 by means of which the generator is adapted to be connected to the distribution circuit 1. 10 represents a voltage reducing means for reducing the voltage applied to the generator when it is connected to the distribution circuit and, as shown, comprises a reactance connected in series with each phase of the generator. These reactances are adapted to be short circuited by a contactor 11 when in its closed position. It is to be understood, however, that any other suitable voltage reducing means such as, for example, a resistance or a transformer with low voltage taps may be used in place of the reactances.

For the purpose of supplying direct current to the field winding of the generator, I provide an exciter 13 which is driven by a motor 14. The motor 14 is adapted to be connected to a control circuit 15 by means of a contactor 16. The control circuit 15 is adapted to be supplied with energy from the distribution circuit 1 by means of the disconnecting switch 7 and a transformer 17. The circuit of contactor 16 is controlled by a switch 21 and a relay 29.

The exciter may be any suitable type, it being shown as a compound wound machine. The shunt field winding 18 and an adjustable resistance 19 are connected in series across the terminals of the exciter. The resistance 19 is normally short circuited through the contacts of a relay 20. The coil of this relay 20 is connected across the terminals of the exciter and is arranged so that the relay does not operate to open the circuit around the resistance 19 until the voltage of the exciter reaches a predetermined value so that the exciter voltage will build up quickly. The switch 21 is adapted to connect one brush of the exciter 13 to the positive exciter bus 22 and the other brush of the exciter to the negative exciter bus 22. In series with the last mentioned brush and the negative exciter bus, there is connected a series field winding 23. The slip rings 12 of the generator 5 and an adjustable resistance 24 are adapted to be connected in series across the exciter buses 22 by means of a contactor 25 and a switch 26. In order to short circuit a portion of the resistance 24, so as to increase the excitation of the generator after it has pulled into step, I provide a contactor 27. It will be observed that while the contactor 25 is in its open position the slip rings 12 are short circuited through a discharge resistance 28.

30 represents a low voltage relay connected across the exciter buses 22 and controlling the circuit of a contactor 31 so that the contactor cannot remain closed unless the exciter voltage is above a predetermined value. The contactor 31 controls the shutting down of the plant in a manner hereinafter described.

32 represents diagrammatically a centrifugally operated switch connected to the rotating element of the generator 5 and adapted to close a circuit through contacts 33 when the speed of the generator reaches a predetermined value. The completion of the circuit through contacts 33 energizes a relay 34 which operates and opens the original energizing circuit of contactor 31 and causes the plant to shut down unless the low voltage relay 30 has operated.

The circuit of the contactor 31 is also controlled by the overload relays 35 and 36 which are connected to different phases of the generator 5 by means of current transformers 37 and 38, and by the thermostats 39 which are connected to different parts of the apparatus and are adapted to interrupt the circuit when the temperature of the apparatus exceeds a predetermined value.

In order to shut the plant down when the output thereof decreases below a predetermined value, any suitable load responsive device may be used. The particular means I have shown is a contact-making wattmeter 40 having a current coil 41 connected in series with the current transformer 38 and a potential coil 42 connected to one phase of the generator by means of the potential transformer 43. The movable contact 44 of the contact-making wattmeter is arranged to remain out of engagement with the stationary contact 45 as long as the output of the generators 5 exceeds a predetermined amount. The contacts 44 and 45 control the circuit of a relay 46 which in turn controls the circuit of contactor 31.

The water-wheel 6 is provided with any suitable means whereby it may be automatically started and stopped and whereby the speed thereof is maintained at a predetermined value while in operation. The particular means, which I have shown, comprises a motor operated gate 48 which is adapted to be opened whenever the predetermined condition occurs which starts the plant up and to be closed when the plant is to be shut down, and a speed governor 49 for maintaining the speed constant at a predetermined value while the wheel is running. For opening and closing the gate 48 I provide a motor 50 which is adapted to be connected to the control circuit 15 by means of the contactors 51 and 52. Contactor 52 is arranged to be closed whenever the plant is to be started up and completes a circuit for the motor 50 to cause it to rotate in the proper direction to open the gate 48. When the gate is wide open the circuit of the motor 50 is opened by the opening of the contactor 52 due to the operation of a limit switch 55. When the plant is shut down the contactor 51 is closed and completes a circuit for the motor 50 to cause it to rotate in the proper direction to shut the gate 48. When the gate is completely shut, a limit switch 56 is arranged to be operated to open the circuit of contactor 51 so as to stop the motor 50.

For the purpose of controlling the operation of most of the relays and contactors by means of which the water-wheel 6 is started and stopped and the generator 1 connected to and disconnected from the circuit 1, I provide a controller 60. This controller mechanically determines by means of the relative position of the segments carried thereby, the sequence of operation of the relays and contactors so that they can only operate in the desired manner and in the desired sequence. In its preferred form, I have illustrated this controller as being made up of fixed contact fingers connected to the various circuits controlled thereby and a cylindrical drum carrying segments by means of which the various fingers are interconnected in the desired manner and in the desired sequence. Since this form of controller is well known in the art further description thereof is deemed unnecessary.

For the purpose of rotating the cylindrical drum of the controller, I have provided a motor 61 which is mechanically connected thereto.

The plants may be arranged to automatically start up in response to any desired condition, and for the purpose of this description, I have shown the plants as being started up in response to a predetermined drop in the frequency of the distribution circuit 1. For accomplishing this object, I provide at each automatic plant any suitable frequency responsive device which I have diagrammatically shown as a contact-making frequency meter 63. This meter is provided with a movable contact 64 which is adapted to engage a stationary contact 65 when the frequency of the distribution circuit 1 drops below a predetermined value. The engagement of contacts 64 and 65 completes a circuit which causes the plant to start up in a manner hereinafter described.

In order to determine the sequence in which the plants are started up and connected to the distribution circuit 1, I provide each plant with any suitable timing device which is adapted to delay the starting up of the plant after the predetermined condition occurs which causes the plant to start up. It will be evident that if each one of these timing devices is adapted to be automatically adjusted by the variations in some particular condition of the plant in which it is employed, such, for example, as the amount of energy available for driving the prime mover therein, the sequence in which the plants are started up and connected to the distribution circuit will depend upon the relative state of this particular condition at the different plants, if the starting period of all the plants is the same.

In the system shown in the drawing the starting-up periods of all the automatic plants are arranged so that they are equal and the sequence in which the plants are started up and connected to the distribution circuit is determined by the relative head of water available in the plants, the first plant to be started up and connected to the circuit, being the one having the highest head of water.

The particular device 66, which I have shown for varying the time it takes for a plant to be started up and connected to the distribution circuit after the predetermined drop in frequency occurs, comprises a time limit relay 67 which controls the circuit of contactor 62 to start the drum controller 60 into operation to start up the plant. The movement of contactor 67 is retarded by a bellows 68 which is provided with a needle valve 69 for adjusting the retarding effect thereof. The position of the needle valve 69 is varied in accordance with the variations in the head of water by means of a float 70 in the reservoir supplying the water-wheel 6. This float is connected to the needle valve by the rack and pinion 71, the gear train 72 and the bevel-gears 73. The adjustment of the needle valve 69 is such that an increase in the head of water increases the opening of the bellows to atmosphere so that the time it takes for the contactor 67 to close decreases as the head of water increases. The float 70 is arranged to open the switch 74 when the water is low so as to prevent the circuit of contactor 67 being closed to start the plant up.

The operation of the system shown is as follows: Let it be assumed that the distribution circuit 1 is being supplied with energy from the manually-controlled plant 2 and that the automatic plants 3 and 4 are shut down. Also let it be assumed that the switches 7, 21, 26 and 75 in all of the automatic plants are closed. Under these conditions the control circuit 15 in each plant is energized. As long as the frequency of distribution circuit 1 remains above a predetermined value, the movable contact 64 of the frequency meter 63 in each automatic plant remains out of engagement with its respective stationary contact 65.

When the frequency of the distribution circuit 1 drops below a predetermined value, thereby indicating that there is an excessive load on the manually-controlled plant 2, the movable contact 64 of the frequency meter 63 in each automatic plant engages its respective stationary contact 65 and completes a circuit from the upper conductor of control circuit 15, right-hand contact of switch 75, coil of contactor 67, contacts of switch 74, contacts 64 and 65 of the frequency meter 63, left-hand contact of switch 75 to the lower conductor of control circuit 15. The closing of this circuit in each plant causes the contactor 67 therein to close after a predetermined interval determined by the head of water. As above stated, the contactor 67 in the plant having the highest head of water is adapted to close first and completes a circuit for contactor 62 through contact fingers $o$ and $p$ and segments of the controller 60 in position $k$ which is the off position. The contactor 62 thereupon closes and completes the circuit of the motor 61 and the braking coil 76 connected in series therewith. Motor 61 then moves the controller 60 out of position $k$ and into position $a$. The braking coil 76 is used in connection with an electromagnetically-controlled brake which is so designed that when the coil 76 is energized a friction brake is released, and when the coil is deënergized the friction brake is applied.

In position $a$ of the controller 60, a circuit is completed from control circuit 15 through right-hand contact of switch 75, fingers $o$ and $aa$ and segments of the controller, contacts of relay 34 which is not energized at this time, coil of contactor 31, contacts of relays 36, 35 and 46, thermostats 39, contacts of switch 74, contacts 64 and 65 of the frequency meter 63, and left-hand contact of switch 75. The completion of this circuit closes contactor 31, whereupon a circuit is completed from the control circuit 15 through the bottom contact of contactor 31, fingers $t$ and $dd$ and segments of the controller 60 and the winding of relay 29. The energization of relay 29 completes the circuit of contactor 16 which connects the motor 14 to the control circuit 15. Motor 14 comes up to speed quickly thereby bringing the exciter 13 up to speed. Relay 20, as above stated, is arranged to open the short circuit around the resistance 19 when the exciter voltage reaches a certain value. The low voltage relay 30 also operates when the voltage of the exciter reaches a predetermined value and closes a holding circuit for the coil of contactor 31 through its upper interlock contacts, fingers $v$ and $o$ and segments of the controller 60, so that the contactor 31 remains closed after the controller leaves position $b$ at which time the circuit through finger $aa$ is open.

In the meantime the controller 60 has been rotating due to the circuit of the motor 61 being closed by the contactor 62. In position $b$ of the controller a circuit is completed through the bottom interlock contact of contactor 31, fingers $t$ and $s$ and segments of the controller 60, limit switch 55, coil of contactor 52 and upper interlock contact of contactor 51. Contactor 52 closes and completes a circuit for the gate motor 50 so that it rotates in the proper direction to open the gate 48 to allow water to flow to the waterwheel 6. The above circuit for the contactor 52 remains closed until the gate 48 is completely opened, at which time switch 55 is opened.

In positions $a$ and $b$ of the controller 60, the contactor 62 is energized by a circuit completed through fingers $o$ and $p$ of the controller. When the controller moves into the position $c$, this circuit of the contactor 57 is broken and the controller stops in position $c$ until the generator 5 comes up to approximately synchronous speed. When the speed of the generator reaches a predetermined value, usually a few revolutions per minute below its normal speed, the centrifugal switch 32 closes, thereby completing a circuit from the control circuit 15 through fingers $o$ and $z$ and segments of the controller 60, contacts 33, fingers $y$ and $q$ and segments of the controller 60 and coil of contactor 62. Contactor 62 then closes the circuit of the motor 61 to start the controller into operation. In position $d$ of the controller, the above traced circuit for the coil of contactor 62 through fingers $o$ and $p$ of the controller is closed. The closing of the circuit through contacts 33 also completes the circuit of relay 34. This relay operates and breaks the original energizing circuit of the contactor 31 so that the contactor will open and shut the plant down in a manner hereinafter described unless the exciter voltage has built up sufficiently to operate relay 30 to complete the locking circuit of the contactor 31.

While the controller has been moving from position $b$ to $e$, the motor 50 has opened gate 48 sufficiently so that the generator 5 has been brought up to approximately its normal speed. The speed of the generator 5 is maintained at its normal value by means of the speed governor 49 in a well known manner.

When the controller 60 reaches position $e$ a circuit is completed from the control circuit 15 through the lower interlock contact of contactor 31, fingers $t$ and $x$ and segments of the controller and coil of contactor 9. Contactor 9 closes and connects the generator 5 to the distribution circuit 1 in series with the reactances 10 and without any excitation. The purpose of the reactances is to reduce the voltage applied to the generator and thereby limiting the initial rush of current through the generator winding when the circuit is closed.

When the controller 60 reaches position $f$ a circuit is completed from the control circuit 15 through the lower interlock contact of contactor 31, fingers $t$ and $bb$ and segments of the controller and coil of contactor 25. Contactor 25 closes thereby opening the circuit through the discharge resistance 28 and closing a circuit from the positive exciter bus 22 through the right-hand contact of switch 26, middle contact of the contactor 25, slip rings 12 of the generator, all of the resistance 24, upper contact of contactor 25, left-hand contact of switch 26 to negative exciter bus 22. The field winding of the generator 5 is thereby supplied with a small field current to pull the generator into synchronism with the distribution circuit 1. A small field current is used so as to cause as little disturbance as possible on the circuit 1. The contactor 25 also closes a circuit in parallel with the contacts 64 and 65 of the frequency meter 63, so that contactor 67 will not open when the frequency of the distribution circuit 1 is restored to normal.

When the controller 60 reaches position g a circuit is completed from the control circuit 15 through lower interlock contact of contactor 31, fingers t and cc and segments of the controller and coil of contactor 27. Contactor 27 closes and short-circuits a predetermined portion of the resistance 24, thereby strengthening the field current of the generator 5 to its normal value.

When the controller reaches position h a circuit is completed from the control circuit 15 through fingers t and w and coil of contactor 11 to short-circuit the reactances 10. Since the generator 5 is supplying energy to the distribution circuit 1, the movable contact 44 of the contact-making wattmeter 40 will be out of engagement with contact 45 and, therefore, a circuit is not completed through the relay 46 at this time. In position h of the controller, which is the running position, the circuit of the contactor 62 through finger p is broken so that the control motor 61 stops.

The generator 5 of the plant having the highest head of water is now in step and is carrying its share of the load on the distribution circuit 1 through the action of the water-wheel governor 49.

When the first plant begins to supply energy to the distribution circuit 1, the frequency of the circuit is restored to normal, unless the total load connected to the circuit still exceeds the capacity of the plants connected thereto, under which condition additional plants are connected to the distribution circuit. When the normal frequency is restored, the movable contact 64 of the frequency meter 63 in each automatic plant is moved out of engagement with its respective stationary contact 65. The disengagement of contacts 64 and 65 opens the circuits of contactors 67 and 31 in all of the stations except those connected to the distribution circuit. The opening of the contactor 31 in each plant interrupts the circuits of any of the contactors 9, 11, 16 and 52 therein which may have been closed, thereby restoring the generator and the exciter circuits to their normal condition. The opening of contactor 31 also closes a circuit from the control circuit 15 through the coil of contactor 62, fingers q and y and segments of the controller 60 and upper interlock contact of the contactor 31. This circuit for the contactor 62 remains closed from whatever position the controller is in at the time the frequency is restored until the controller 60 reaches the off position k. The opening of the contactor 31 also completes a circuit from the control circuit 15 through the middle interlock contact of the contactor 31, limit switch 56, coil of contactor 51 and upper interlock contact of contactor 52. The completion of this circuit closes the contactor 51, whereupon a circuit for the gate motor 50 is completed, so that the motor rotates in the proper direction to close the gate 48. When the gate is closed, limit switch 56 is operated to open the circuit of the contactor 51 to stop the motor 50.

This action takes place in all the automatic plants, except those which have been connected to the distribution circuit 1. In each of these latter plants the contactor 25, which is in its closed position, completes, at its lower interlock contact, a circuit in parallel with the contactors 64 and 65 of the frequency meter 63, so that the contactors 67 and 31 therein are not opened when the frequency of the distribution circuit is restored to its normal value. Each automatic plant connected to the distribution circuit continues to run and supply energy to the distribution circuit until certain predetermined conditions cause the station to automatically shut down.

The plant shown in the drawing shuts down in response to any one of several different conditions. If the output of the generator 5 drops below a predetermined value, movable contact 44 of the contact-making watt-meter 40 engages stationary contact 45, thereby completing the circuit for relay 46. Relay 46 energizes and interrupts the circuit of contactor 31. Contactor 31 opens and interrupts the circuits of contacts 9, 11, 25 and 27 and relay 29. The opening of contactor 9 disconnects the generator 5 from the distribution circuit 1. The deënergization of relay 29 opens the circuit of the contactor 16, which opens and disconnects the motor 14 from the control circuit 15. The opening of contactors 25 and 27 restores the field circuit of the generator to its idle condition. The opening of contactor 31 also closes the above traced circuit for contactor 51 to cause the gate 48 to be closed and the above traced circuit for contactor 62 to restore the controller 60 to its off position.

The plant is also arranged to shut down when the head of water drops below a predetermined value, in order to keep it from draining the source. This is accomplished by having the float 70 open a switch 74 connected in series with the coil of contactor 31 whenever the head of water drops below a predetermined value. Furthermore, it will be observed that when the controller 60 is in its off position and the float 70 is below the predetermined level, the circuit through the coil of contactor 31 cannot be closed as the switch 74 is open. Therefore, it is impossible to start up the plant under low water conditions, even though the frequency of the distribution circuit 1 drops below the predetermined value.

The circuit of contactor 31 is also controlled by the relays 35 and 36 and the thermostats 39 so that the contactor 31 is opened and the plant shut down, in the manner above described, whenever the power transferred from the generator 5 to the distribution circuit 1 exceeds a predetermined amount or the temperature of the apparatus exceeds a predetermined value.

While I have shown and described my invention in connection with hydro-electric plants in which the automatic operation is initiated in response to a drop in frequency of the distribution circuit to which the plants are adapted to be connected, it will be obvious to those skilled in the art that certain features, which I disclose, are of utility whether the initial control circuit is closed manually or automatically in response to some predetermined condition of the distribution circuit.

Moreover, while I have shown particular apparatus for performing certain automatic operations, my invention is not limited to the specific apparatus illustrated. I, therefore, intend to cover all such modifications and applications which fall within the true spirit and scope of my invention as set forth in the appended claims.

What I claim as new and desire to secure by Letters Patent of the United States, is,—

1. In a system of electrical distribution, a distribution circuit, a plurality of prime mover dynamo plants adapted to supply electrical energy to said circuit, means responsive to a predetermined condition for automatically starting up and connecting said plants to said circuit, and means associated with each plant and responsive to a condition thereof for determining the sequence in which said plants are connected to said circuit.

2. In a system of electrical distribution, a distribution circuit, a plurality of prime mover dynamo plants adapted to supply electrical energy to said circuit, means responsive to a predetermined condition of said circuit for automatically starting up and connecting said plants to said circuit, and means associated with each plant and responsive to a condition thereof for determining the sequence in which said plants are started up and connected to said circuit.

3. In a system of electrical distribution, a distribution circuit, a plurality of prime mover dynamo plants adapted to supply electrical energy to said circuit, means responsive to a predetermined condition for automatically starting up said plants, connecting them to said circuit in a sequence determined by a condition of said plants, and for automatically shutting down the plants which have started up but which have not begun to supply energy to the circuit when said predetermined condition is removed.

4. In a system of electrical distribution, a distribution circuit, a plurality of prime mover dynamo plants adapted to supply electrical energy to said circuit, and means controlled by a predetermined abnormal condition of said circuit and a condition of said plants for automatically starting up and connecting said plants to said circuit in a sequence determined by said condition of said plants to supply energy to said circuit to restore said condition thereof to normal and for automatically shutting down the plants started up but not supplying energy to said circuit when said condition of the circuit is restored to normal.

5. In a system of electrical distribution, a distribution circuit, a plurality of generators adapted to supply energy to said circuit, prime movers for said generators, variable sources of energy for driving said prime movers, and means controlled by a predetermined condition of said circuit and the amount of energy in said sources for automatically starting up said prime movers, and for automatically connecting the generators associated with said prime movers to said circuit in a sequence determined by the relative amounts of energy in said sources.

6. In a system of electrical distribution, a distribution circuit, a plurality of prime mover dynamo plants adapted to supply electrical energy to said circuit, means responsive to a predetermined condition for automatically starting up and connecting said plants to said circuit to furnish energy thereto, and means associated with each plant and controlled by a condition thereof for varying the time required to bring said plant into operation in response to said predetermined condition.

7. In a system of electrical distribution, a distribution circuit, a plurality of generators adapted to supply energy to said circuit, prime movers for said generators, variable sources of energy for driving said prime movers, means responsive to a predetermined condition for automatically starting up said prime movers and for automatically connecting the generators associated with said prime movers to said circuit to supply energy thereto, and means associated with each prime mover and controlled by a condition of the source of energy for driving said prime mover for varying the time required to bring said prime mover and the generator associated therewith into operation to furnish energy to said circuit in response to said predetermined condition.

8. In a system of electrical distribution, a distribution circuit, a plurality of generators adapted to supply energy to said circuit, prime movers for said generators, variable sources of energy for driving said prime movers, means responsive to a predetermined condition for automatically starting up said prime movers and for automatically connecting the generators associated with said circuit to supply energy thereto, said last mentioned means including a time limit relay associated with each generator and arranged to control the time required to bring into operation the generator associated therewith, and means controlled by a condition of the source of energy for driving a generator for adjusting the time limit relay associated therewith to vary the operating time of the relay.

9. In a system of electrical distribution, a distribution circuit, a source of electrical power connected thereto, a plurality of generators adapted to supply electrical energy to said circuit, prime movers for said generators, variable sources of fluid energy for driving said prime movers, means responsive to a predetermined drop in the frequency of said system and to the relative amount of energy available in said sources of fluid energy for automatically starting up said prime movers and connecting the generators associated therewith to said circuit in a sequence determined by the relative amount of energy in said sources of fluid energy, and means associated with each generator and responsive to the output thereof for automatically disconnecting the generator from the circuit and shutting down the prime mover associated therewith.

In witness whereof I have hereunto set my hand this 13th day of March, 1920.

CLAUDE W. PLACE.